US006714860B1

(12) United States Patent
Wawra et al.

(10) Patent No.: US 6,714,860 B1
(45) Date of Patent: Mar. 30, 2004

(54) NAVIGATION DEVICE WITH MEANS FOR DISPLAYING ADVERTISEMENTS

(75) Inventors: Martin Wawra, Duesseldorf (DE); Ralph Behrens, Harsum (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 09/723,215

(22) Filed: Nov. 27, 2000

(30) Foreign Application Priority Data

Nov. 30, 1999 (DE) .......................................... 199 57 550

(51) Int. Cl.⁷ .......................... G01C 21/30; G01C 21/26
(52) U.S. Cl. .................. 701/207; 701/213; 342/357.06; 342/357.17; 455/456.3
(58) Field of Search ................................. 701/200, 207, 701/213; 705/1, 14, 27, 26, 410, 411; 340/517, 525, 988, 989, 990, 995.17, 996; 342/357.01, 357.06, 357.09, 357.12, 357.13, 357.17; 455/456.1, 456.2, 456.3, 456.5, 456.6

(56) References Cited

U.S. PATENT DOCUMENTS

| 6,360,164 B1 | * | 3/2002 | Murayama ................. 455/456 |
| 6,360,167 B1 | * | 3/2002 | Millington et al. .... 342/357.06 |
| 6,374,177 B1 | * | 4/2002 | Lee et al. .................... 340/988 |

FOREIGN PATENT DOCUMENTS

| DE | 39 25 057 A1 | 1/1991 | | |
| DE | 38 52 415 T2 | 6/1995 | | |
| DE | 196 39 546 A1 | 4/1998 | | |
| DE | 198 52 662 A1 | 5/2000 | | |
| DE | 198 54 133 A1 | 5/2000 | | |
| JP | 08076706 A | * | 3/1996 | ............ G09F/19/00 |
| JP | 08138193 A | * | 5/1996 | ......... G08G/1/0969 |
| JP | 09244566 A | * | 9/1997 | ............ G09F/21/04 |
| JP | 11248484 A | * | 9/1999 | ............ G01C/21/00 |
| WO | WO 9621161 A1 | * | 7/1996 | ............ G01S/5/02 |

OTHER PUBLICATIONS

Patent Abstract of Japan JP 0011325923AA, Nov. 26, 1999, Sony Corp.

* cited by examiner

Primary Examiner—Jacques H. Louis-Jacques
(74) Attorney, Agent, or Firm—Michael J. Striker

(57) ABSTRACT

The navigation device is provided with a device for display of advertisements in a scene of a particular region or area. The navigation device has a processor (1,12), a memory (2,13), a positioning device (3,14), an optical display (5,16), an acoustic display (8,19), a receiver (6,17) and an input device (9,20). The scenes displayed by the navigation device are either actual scenes for an area or region in which the navigation is located or simulated scenes. The data for the display of the scene are either loaded from a data or information-bearing medium, such as a CD-ROM, or received by means of the receiver. Particular objects in the displayed scene may be connected with additional information which can be requested by the user by the input device. The number of objects, which particularly have advertisements, are established according to the speed of the vehicle containing the navigation device and the position of the navigation device. The navigation device can also be provided with a bus for convenient connection of the components.

16 Claims, 2 Drawing Sheets

NAVIGATION DEVICE WITH MEANS FOR DISPLAYING ADVERTISEMENTS

BACKGROUND OF THE INVENTION

1. Field of the Invention

The present invention relates to a navigation device and, more particularly, to a navigation device including a positioning device, such as a GPS, a processor for establishing a location of the navigation device by means of the positioning device and a display device showing an area as a perspective or two-dimensional scene assembled from a number of objects.

2. Prior Art

A navigation device with a display device showing an area as a perspective or two-dimensional scene assembled from a number of objects is already known.

SUMMARY OF THE INVENTION

It is an object of the present invention to provide an improved navigation device of the above-described type, which has a display device showing an area as a perspective or two-dimensional scene assembled from a number of objects According to the invention the navigation device is provided with means for displaying advertisements and includes a positioning device for collecting position information regarding a current location of the navigation device; a processor including means for ascertaining the current location of the navigation device from the position information and a display device for displaying an area or region as a perspective scene or a two-dimensional scene assembled from objects, some of which have an associated advertisement.

The navigation device also includes means for selecting and assembling the objects to form the scene, for example so that the area or region includes the current location of the navigation device. Preferably the objects can be selected and assembled to form the scene according to the position of the vehicle.

The navigation device according to the invention has the advantage that advertisements are integrated in the scene which is shown by the display device of the navigation device. These advertisements need not be posted in the surroundings of the navigation device. This is a very economical and low-cost method for advertising firms, since then the installation expenses for advertising signs can be avoided and the replacement costs for these advertisements displayed on the display device are considerably better, since only suitable central data need to be changed, in the case that the objects having the advertisements are loaded in a central data source, as in a transmitting station.

Furthermore this type of synthetic advertisement can be tailored to the observer, as is the usual case with television advertisements. Because advertisements may be assigned to a buyer of the navigation device, various services may be connected with the navigation device or the price of the navigation device itself may be exceptionally improved. Moreover this develops a new market for advertising firms.

The advertisements made in this manner are exceptionally flexible and can be fixed or determined by various parameters. Especially a three dimensional animation of the advertisement is an exceptionally attractive instrument for convincing a person exposed to that advertisement.

Various embodiments of the navigation device are possible which include additional features and improvements.

It is particularly advantageous when the navigation device has means for displaying an actual scene or a stored scene, also a simulation, on the navigation device. This is related to a situation in which a user of the navigation device likes to look at a possible route in advance.

Furthermore it is of advantage that the navigation device is loaded with the objects, which are necessary for displaying the scene and also has the advertisements, on a data or storage medium. Because of that the expenses for loading and preparation of the advertisement are exceptionally low.

Furthermore it is advantageous when the objects which are used for the display of the scene are received by means of a receiving station or receiver. Because of that it is advantageously possible to integrate the actual objects and especially the actual and location-dependent advertisements in the scene. This increases the attractiveness and acceptance of these advertisements, since a driver and his or her passenger feel well informed by the actual and location-related advertisements.

In a preferred embodiment of the invention the receiving station is also provided with means for transmission of signals so that the receiving station is in a position to request certain information from a data source. Because of this feature certain objects can be loaded which the user of the navigation unit has designated in advance. This expands the spectrum of available data sources considerably and increases the attractiveness of the invention.

In an advantageous additional embodiment of the invention the navigation device can load objects for the display of the scene both from the data or recording media and from the receiving station. Because of this feature both loading speed of the objects and efficient updating of the objects can be combined in one embodiment so that a rapid display image formation with updating is provided.

Furthermore it is of advantage that objects in the displayed scene are coupled with acoustic signals, which either contain speech or music. A multimedia presentation, especially of advertisements, is thus possible. This leads to a greater convincing power of the displayed advertisements.

In an additional embodiment of the invention means for requesting additional information are provided for the user so that interactivity is provided. This additional information can included video displays, audio data streams, additional image formers, animation, text superposition or fade in, or information for addresses, which is coupled with an object, in order to supply E-mail. Especially animation of synthetic objects has reduced memory needs.

Furthermore it is advantageous that a display of a location-dependent advertisement is possible according to a location ascertained by a position determining device. Only relevant advertisements for those products and services, which he or she can obtain at locations which he or she can reach, are displayed.

Furthermore the number of objects which have advertisements is preferably dependent on the vehicle speed and/or the position of the navigation device. Thus too large detours or rout diversions are avoided in critical situations for the user of the navigation unit. This leads to a reduced risk of an accident.

In a preferred embodiment of the invention a user profile is set up in the processor for the user of the navigation device, so that the processor can retrieve those advertisements which would be interesting to this user and does not load those advertisements which the user would not be interested in based on the user profile.

Furthermore it is particularly advantageous when the displayed objects are present in a known multimedia standard format, preferably MPEG-4, so that compatibility for different advertising fields and other services, which offer objects for display in the navigation unit, is guaranteed. This guarantees great market penetration for the this navigation device.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE PREFERRED EMBODIMENTS

The navigation device provides graphic and acoustically assisted route guidance with as realistic as possible a display on the display device of the navigation unit to help the user. That simplifies the reproduction of an actual scene. Acoustic advisory message from the navigation device lead to improved guidance of the user to his or her destination.

Navigation devices are generally still rather expensive and also services connected with the navigation devices cost money. Advertisement is a means known from the media, such as television and printed media, in order to greatly reduce the buyers' cost for the media, service or a device.

According to the invention advertisements are blended into the scene which is displayed in the navigation device. The advertisements are placed as if they were an actual element of the surroundings.

Figure 1:
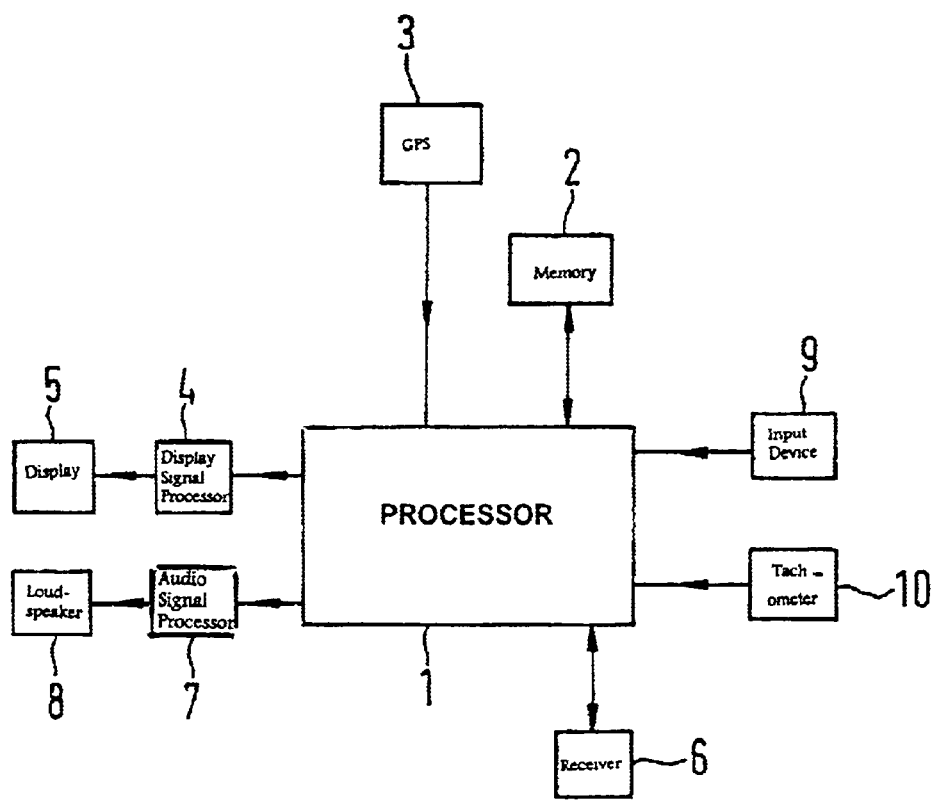
FIG. 1 is a block diagram of a first embodiment of a navigation device according to the invention.

One embodiment of a navigation unit or device is shown in FIG. 1. The navigation device has a processor 1. The processor 1 is connected with a memory 2 by means of a first data input/output. This memory 2 has a data or recording medium, which contain objects for setting up a scene for the navigation device. Furthermore the memory 2 has free memory capacity in order to store new data. The data or recording medium can be e.g. a re-writtable magneto-optic memory media, such as DVD (Digital Versatile Disc), CD-ROM or mini-disk. Either these storage media or additional magnetic storage media, such as a hard disk, may be used for new storage of data.

The processor 1 is connected with a positioning device 3 by means of a first data input. The positioning device 3 is a GPS (Global Positioning System), which determines its actual position and thus, because the positioning device is part of the navigation device, also the position of the navigation device. The positioning device 3 transmits this position to the processor 1, so that a scene of the actual location is displayed and also location-dependent objects are inserted in the scene.

The processor 1 is connected with a display signal processing device 4 via an output. The display signal processing device 4 prepares data coming from the processor 1 for display of a scene on the display device 5. The display device 5 may be a monitor, which is used for display of a scene for the navigation device. The display 5 and the display signal processing device 4 are parts of the navigation device. Alternatively however in other embodiments a display device can be used with the navigation device, which is used for this purpose. There are other possibilities for displaying a scene, especially in a motor vehicle, besides a monitor. A projector, which is directed at the windshield, a so-called heads-up display, is another possibility. It projects only certain elements, e.g. the tachometer reading, the fuel level reading and the cooling water temperature on the windshield which acts as the projection screen. It is advantageous that the driver does not need to look down from the street to observe the readings on these devices.

The display device 5 can be constructed in other embodiments as a retinal projector. An electronically modulated light beam is projected through the pupil on the retina. This light beam stimulates the light receptors in the retina, so that an image is generated on the retina. The image source supplies the data displayed on the light source which is modulated according to the image data. This light source has three different colors, red, green blue, so that the information can be displayed in the correct colors by a suitable mixing of the light of these three light sources. Sufficiently low power is used for the light so that the retina is not damaged.

The modulated light is scanned by a scanning device over the retina. This must take place suitably rapidly so that the entire retina is activated as it appears in normal vision. Optics are connected to the scanner which project the modulated light beam on the eye. This retinal projector is then attached to the dashboard so that the driver receives the information projected in his eye when he or she looks in a suitable direction.

Display device 5 can alternatively be a special display screen. Particularly autostereoscopic display screens use two images of an object to be displayed on it. These images are produced so that the eyes of the observer see these images separately. This is achieved by providing the observer with suitable glasses which have different filters so that both eyes see different things. Furthermore an analysis of the head position of the driver occurs by means of a display signal processing device so that automatically both images are correlated with the eyes.

According to the particular embodiment of the display device 5 three-dimensional or two-dimensional scenes can be produced by the navigation device. This can occur according to the wish or choice of the driver. For example, he or she could select a two-dimensional display when he or she would like a simplified display. However a two-dimensional display could be selected automatically when a driver is in a difficult situation, in order not to needlessly distract the driver so that he or she can concentration on what is essential. The appropriate situation for this automatic selection corresponds to a stressful or high speed situation.

The processor 1 is connected with an audio signal processing device 7 via a second data output. The signals coming from the processor 1 are prepared for the loudspeaker 8 in the audio signal processing device 7. The loudspeaker 8 is connected to the signal processing device 7 by means of an audio signal output. The audio signal processing device 7 and the loudspeaker 8 are parts of the navigation device according to the invention. Alternatively it is however possible to use an already present loudspeaker of another unit. The loudspeaker unit of the auto radio would be suitable for this purpose when the navigation device is a navigation unit present in a vehicle.

The processor 1 is connected with a receiver 6 via a second data input/output. The receiver 6 is an auto radio, which is provided with means for receiving digital data. DAB (Digital Audio Broadcasting) especially provides the capability for this type of digital radio transmission. DAB has the capability to support transmission of multimedia data as well as audio programs. These data could be decoded by users having a special code or the data could be accessible for all users. When a code is necessary of course it is necessary to obtain the code by purchasing it in order to decode the data. Other digital radio signals, such as DVB (Digital Video Broadcasting) and DRM (Digital Radio Mondial) for receiving multimedia data) are used besides DAB. These methods differ in their transmission bandwidth, in the frame structure and in transmission frequency from DAB. They have comfortable possibilities to transmit other multimedia data besides audio data in their frame structure.

In an additional embodiment of the invention the receiver 6 has means for transmission, so that the receiver 6 can call up or retrieve certain information from external data sources. For example, this can happen by means of a mobile radio network, such as the GSM network. The processor 1 determines what it needs for objects for display of a scene and requests transmission of the needed information with the means for transmission in the receiver 6. The charges for the loading of this information are then handled by means of a telephone bill. These costs can be reduced to zero or at least are decisively affordable or economical by means of the transmitted advertisements.

Only wireless transmission methods which do not limit mobility of the navigation unit are suitable for the receiver 6 with the means for transmission.

In another embodiment of the invention data are loaded both by means of a data or recording medium and from a receiver. An optimum mixture of loading speed and current data is obtained in the case of this embodiment.

An input device 9 is connected to the processor 1 by means of a second data input of the processor 1. This input device 9 allows the user to input data regarding the display of the scene and especially to select particular scenes for display. If a user would like to observe the route to his or her destination in advance, this is possible, since the route to his or her destination is simulated by means of the data stored in the memory 2 at a speed determined by the user. The user can also determine which type of objects should be displayed in the scene.

A keyboard can be provided as input device 9, but also a speech detection system, a joystick, a mouse or an eye movement detection system are alternatives for the input device.

The processor 1 is connected with a tachometer 10 of a vehicle containing the navigation device and the user by means of a third data input. Thus it is possible to influence the display of the scene according to the vehicle speed. Especially the detailed representation of the scene can be reduced at high speed in order, on the one hand, not to distract the driver and, on the other hand, because the driver does not have the time to view these details.

The user of the navigation system determines his or her route to his or her destination by input of information to the navigation system by means of the input device 9. Also additional information connected with certain objects is retrieved by means of the input device 9. Objects with advertisements of course are especially interesting according to the invention. This additional information includes video sequences, audio information, text information or other graphic representations. In an additional embodiment of the invention means are provided so that the user observes an E-mail, e.g. a purchase application or order, when he or she clicks on the object having the advertisement.

The processor 1 determines the number of objects to be displayed, also according to the location which is determined with the positioning device 3. If the user of the navigation system is found in a city with a large traffic increase, a extensive display of a scene would only be distracting and is senseless. In this situation the processor 1 reduces the number of objects which are used for the display of the scene. Furthermore superposition of advertisements is performed according to location in order to supply the driver with locally important advertisements.

The processor 1 deposits a user profile for a user in the memory 13, which contains information regarding the subjects which he or she prefers for the advertisements. If the user desires e.g. advertisements from supermarkets and food businesses, then he only loads the appropriate advertisements.

Posters having the advertisements are blended in the displayed scene. These posters are not present in the real scene, and so they are synthetic. Instead of posters, for example, a video clip or an audio clip could be blended into the displayed scene.

Especially synthetic objects, which are animated, but have an attractive form provide an attractive form of advertisement. A spark plug, from which a spark jumps, an animate unit or an entire auto, which can be observed from all sides are examples.

Fields are blended in, which have advertisements, in a two-dimensional display, which for example is similar to a card. Generally it is difficult to integrate a synthetic advertisement in a displayed scene which is true to the real scene.

As explained above the amount of the advertisement is determined by various parameters. Also the user profile, the vehicle speed and eventually also the stressful situations that the driver is under, which are determined by suitable means, are examples of the parameters. These means include image detection and analysis and speech analysis, which depend on the degree to which the driver is excited. These means are connected with the processor 1 which evaluates the state of the driver so that the number of the advertisements provided in the displayed scene is controlled accordingly.

Figure 2:
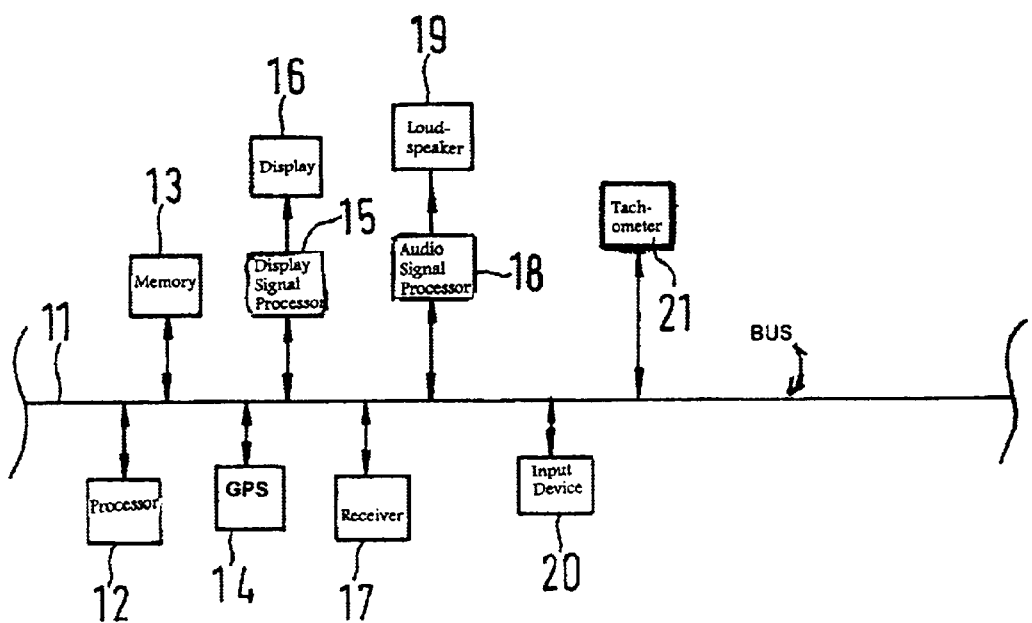
FIG. 2 is a block diagram of another embodiment of a navigation device according to the invention in which the components of the navigation device and the components connected to the navigation device are connected by means of a bus.

In FIG. 2 another embodiment of the navigation device according to the invention is shown in FIG. 2. Components which are part or the navigation device and components connected to the navigation device are connected with each other by means of bus 11. All components, which are directly connected to the bus 11, have a device, which permits communication over the bus 11. This device is a suitable microcontroller.

A processor 12 is connected to the bus 11 by means of a data input/output. A memory 13 is connected to the bus 11, which has one or more data or recording media. A positioning device 14, a receiver 17, an input device 20 and a tachometer 21 are connected to the bus 11. Also voice and display signal processing devices 15 and 18 are connected to the bus 11. A display device 16 is connected to a data output of the display signal processing device 15. A loudspeaker 19 is connected to the data output of the audio signal processing device 18.

The function of the individual components of the embodiment of FIG. 2 is the same as the corresponding components of the embodiment of FIG. 1.

The objects to be stored, from which the scene to be displayed is assembled, are stored in a generally used multimedia standard format. MPEG-4 is an example of this type of format. A large number of objects from different fields can be supplied for scene representation by means of MPEG-4. Also of course MPEG-4 can supply many different advertisements.

The disclosure in German Patent Application 199 57 550.9-52 of Nov. 30, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a navigation device with means for displaying advertisements in a simulated scene, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A navigation device with means for displaying advertisements, said navigation device comprising
   a positioning device (3, 14) for collecting position information regarding a current location of the navigation device;
   a receiving station (6, 17) for supplying a plurality of objects;
   a display device (5, 16) for displaying an area or region as a respective scene or a two-dimensional scene assembled from said plurality of objects, wherein at least one of said plurality of objects having an associated advertisement, and said at least one of said plurality of objects being activated for transmitting an order; and
   a processor (1, 12) including means for ascertaining the current location of the navigation device from said position information supplied thereto from said positioning device (3, 14), wherein said processor includes means for obtaining said plurality of objects from said receiving station (6, 17) and for transmitting said plurality of objects from said receiving station (6, 17) to said display device (5, 16) for producing a scene from said plurality of objects, wherein at least one of said objects is activated from transmitting said order using an E-mail.

2. The navigation device as defined in claim 1, further comprising means for assembling said objects to form said scene of said area or said region so that said area or said region includes said current location of said navigation device.

3. The navigation device as defined in claim 2, further comprising a memory (2, 13) for storing said scene and wherein said processor (1, 12) includes means for retrieving said scene from said memory.

4. The navigation device as defined in claim 2, wherein said means for assembling said objects to form said scene of said area or said region is located in said processor (1, 12) and selects said objects for assembly to form said scene from a memory (2, 13) according to said current location established by said processor (1, 12) with the aid of said positioning device (3, 14).

5. The navigation device as defined in claim 2, wherein said means for assembling said objects to form scene of said area or said region is located in said processor (1, 12) and selects said objects for assembly to form said scene from a memory (2, 13) according to a vehicle speed of a vehicle containing the navigation device.

6. The navigation device as defined in claim 2, wherein said processor has means for determining a state of excitation of a driver of a vehicle containing the navigation device, said means for assembling said objects to form said scene of said area of said region is located In said processor (1, 12), said means for assembling said objects selects said objects for assembly to form said scene from a memory (2, 13) according to said state of excitation of said driver.

7. The navigation device as defined in claim 1, further comprising a memory (2, 13) for said objects including said at least one object with said associated advertisement and wherein said processor (1, 12) includes means for retrieving said objects from said memory (2, 13) and for transmitting said objects retrieved from said memory to said display device (5, 16) for producing said scene from said objects retrieved from said memory.

8. The navigation device as defined in claim 7, wherein said memory (2, 13) comprises an information-bearing medium selected from the group consisting of CD-ROM, DVD, hard disk and mini-disk data.

9. The navigation device as defined in claim 7, further comprising means (8, 19) for producing an acoustic presentation and wherein said processor (1, 12) has means for generating acoustic signals and for transmitting said acoustic signals to said means for producing said acoustic presentation, so that said acoustic presentation is presented.

10. The navigation device as defined in claim 1, wherein said receiving station (6, 17) includes means for transmitting requests for advertisement information and other data.

11. The navigation device as defined in claim 1, further comprising a memory (2, 13) for said objects including said at least one object with said associated advertisement and wherein said processor (1, 12) includes means for obtaining a first portion of said objects from a receiving station (6, 17), means for retrieving a remaining portion of said objects from said memory (2, 13) and means for transmitting said first portion of said objects obtained from said receiving station (6, 17) and said remaining portion of said objects to said display device (5, 16) for producing said scene from said objects.

12. The navigation device as defined in claim 1, further comprising an input device (9, 20) for inputting additional information to said processor (1, 12) and wherein said processor (1, 12) includes means for linking said additional information with said objects assembled to produce said scene.

13. The navigation device as defined in claim 1, wherein said processor (1, 12) includes means for determining a content of said associated advertisement according to a user profile of a user.

14. The navigation device as defined in claim 1, wherein said objects are coded in a standard multimedia format.

15. The navigation device as defined in claim 14, wherein said standard multimedia format is MPEG-4.

16. The navigation device as defined in claim 1, further comprising a memory (2, 13) and a bus (11) for connecting said positioning device (3, 14), said processor (1,12), said memory (2, 13) and said display device (5, 16) with each other.

* * * * *